US012568944B1

(12) United States Patent
Bryant, III

(10) Patent No.: US 12,568,944 B1
(45) Date of Patent: Mar. 10, 2026

(54) BAITING MULTI-TOOL APPARATUS

(71) Applicant: William James Bryant, III, Albany, GA (US)

(72) Inventor: William James Bryant, III, Albany, GA (US)

( * ) Notice: Subject to any disclaimer, the term of this patent is extended or adjusted under 35 U.S.C. 154(b) by 0 days.

(21) Appl. No.: 18/827,968

(22) Filed: Sep. 9, 2024

(51) Int. Cl.
A01K 97/05 (2006.01)
A01K 97/04 (2006.01)

(52) U.S. Cl.
CPC ............ A01K 97/05 (2013.01); A01K 97/045 (2013.01)

(58) Field of Classification Search
CPC ....... A01K 97/04; A01K 97/045; A01K 97/05
See application file for complete search history.

(56) References Cited

U.S. PATENT DOCUMENTS

| | | | | | |
|---|---|---|---|---|---|
| 2,502,816 A | * | 4/1950 | Bennek | ................. | A01K 97/05 |
| | | | | | 43/4 |
| 2,531,551 A | * | 11/1950 | Brecht | ................... | A01K 97/05 |
| | | | | | 43/55 |
| 3,059,369 A | * | 10/1962 | Swanson | ............... | A01K 97/18 |
| | | | | | 43/4 |
| 3,065,561 A | * | 11/1962 | Swanson | ............... | A01K 97/05 |
| | | | | | 43/4 |

| | | | | | |
|---|---|---|---|---|---|
| 3,308,570 A | * | 3/1967 | Horton | .................. | A01K 97/04 |
| | | | | | D22/136 |
| 3,354,575 A | * | 11/1967 | Darrow | ................. | A01K 97/05 |
| | | | | | 43/56 |
| 3,541,722 A | * | 11/1970 | Garrison | ............... | A01K 97/00 |
| | | | | | 43/56 |
| 3,753,308 A | * | 8/1973 | Swanson | ............... | A01K 97/05 |
| | | | | | 43/4 |
| 3,958,356 A | * | 5/1976 | Clingan | ................ | A01K 97/05 |
| | | | | | 43/56 |
| 4,118,807 A | * | 10/1978 | McCauley | ............ | A01K 97/18 |
| | | | | | 43/55 |
| 4,815,230 A | * | 3/1989 | Allen | ..................... | A01K 97/04 |
| | | | | | 43/55 |
| 5,067,270 A | * | 11/1991 | Garrick | ................. | A01K 97/04 |
| | | | | | 43/55 |
| 5,465,522 A | * | 11/1995 | Varda | ..................... | A01K 97/04 |
| | | | | | 43/55 |
| 5,549,227 A | * | 8/1996 | Klotz | ................... | B65B 39/007 |
| | | | | | 141/331 |
| 6,421,951 B1 | * | 7/2002 | Kuhl | ..................... | A01K 97/05 |
| | | | | | 43/56 |
| 2019/0281803 A1 | * | 9/2019 | Hopp | .................. | A01K 97/045 |
| 2020/0137998 A1 | * | 5/2020 | Hopp | ................... | A01K 97/05 |

* cited by examiner

*Primary Examiner* — Richard G Davis
(74) *Attorney, Agent, or Firm* — Law Office of Jerry Joseph, PLC; Jerry Joseph

(57) ABSTRACT

A live baiting multi-tool apparatus including a bait capture member configured to isolate various types of live bait, a first storage compartment detachably coupled to the bait capture member and a second storage compartment detachably coupled to the first storage compartment.

13 Claims, 8 Drawing Sheets

BAITING MULTI-TOOL APPARATUS

BACKGROUND OF THE INVENTION

1. Field of the Invention

The present general inventive concept relates to devices that have been developed that help bait hooks. More specifically, a bait holding compartment is provided to receive and securely hold a single bait specimen in a position permitting easy and convenient hooking onto a fish hook with minimal risk of accidently jabbing your finger or hand due to squirming by the bait specimen.

2. Description of Related Art

There have been previous devices that have been developed for manually baiting a fish hook. However, these devices are not intended for live bait, and hooking a live bait can involve risk that the user can accidently jab themselves with the hook because of squirming by a live bait specimen and the proximity of the fish hook to the user's fingers and hands.

Therefore, what is desired is to help fishermen hook all types of bait, including live bait, easier, cleaner, and quicker.

BRIEF SUMMARY OF THE INVENTION

The present general inventive concept provides a baiting multi-tool apparatus that includes a bait holding compartment that securely holds a live bait specimen for hooking with minimal risk of the user accidentally injuring themselves in attempting to hook a squirming live bait specimen.

The present general inventive concept of the baiting multi-tool apparatus also provides a funnel member that permits a user to easily capture a single live bait specimen that can then be transferred into the bait holding compartment by operating a sliding door that separates the funnel member from the bait holding compartment, causing the specimen to drop into the holding compartment.

The present general inventive concept of the baiting multi-tool apparatus also provides a funnel member that permits a user to easily capture and hook various types of artificial baits.

In one preferred exemplary embodiment, the live baiting multi-tool apparatus buildup of the invention also includes a live bait storage compartment and a tackle storage compartment. However, the present general inventive concept is not limited thereto.

That is, in alternative embodiments, the baiting multi-tool apparatus is designed and configured to capture and align a single piece of artificial bait to be hooked.

Additional features and embodiments of the present general inventive concept will be apparent from the following detailed description, drawings, and claims.

BRIEF DESCRIPTIONS OF THE DRAWINGS

These and/or other aspects of the present general inventive concept will become apparent and more readily appreciated from the following description of the embodiments, taken in conjunction with the accompanying drawings of which:

FIG. 8 shows the sequence of capturing a live bait specimen and transferring the captured live bait specimen into the bait holding compartment using the sliding door that separates the funnel member and the bait holding compartment.

DETAILED DESCRIPTION OF THE INVENTION

Figure 1:
FIG. 1 is a front perspective view a baiting multi-tool apparatus according to an embodiment of the present inventive concept.

Reference will now be made in detail to the exemplary embodiments of the present general inventive concept, examples of which are illustrated in the accompanying drawings, wherein like reference numerals refer to the like elements throughout. The exemplary embodiments are described below in order to explain the present general inventive concept by referring to the figures.

Figure 2:
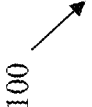
FIG. 2 illustrates a front view of the baiting multi-tool apparatus illustrated in FIG. 1.
Figure 3:
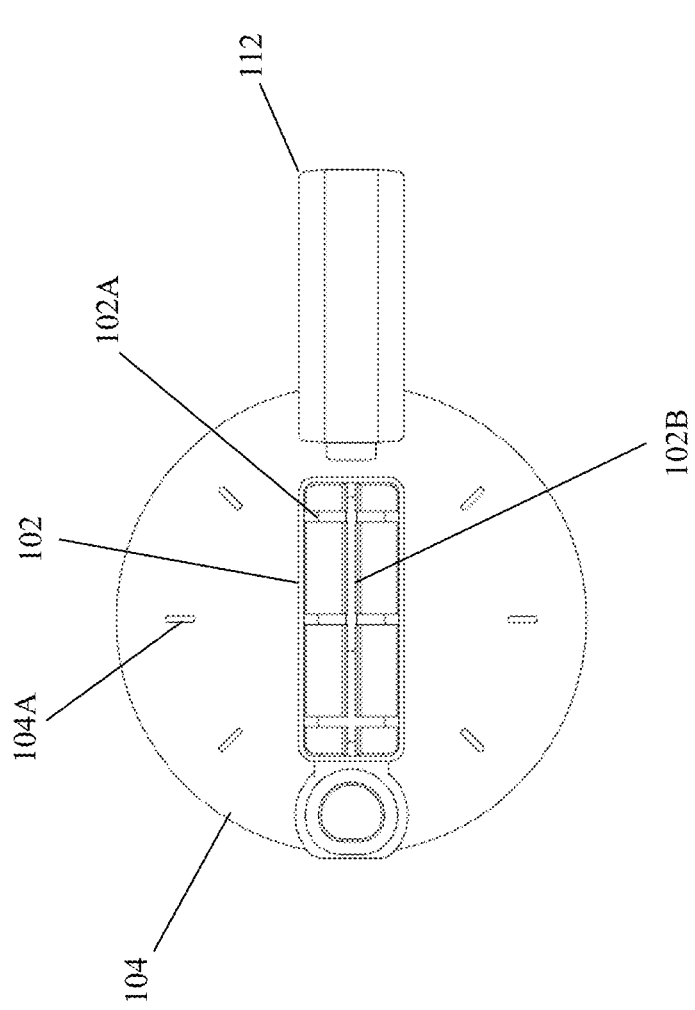
FIG. 3 is a top view of the baiting multi-tool apparatus illustrated in FIG. 1.
Figure 3:
Figure 4:
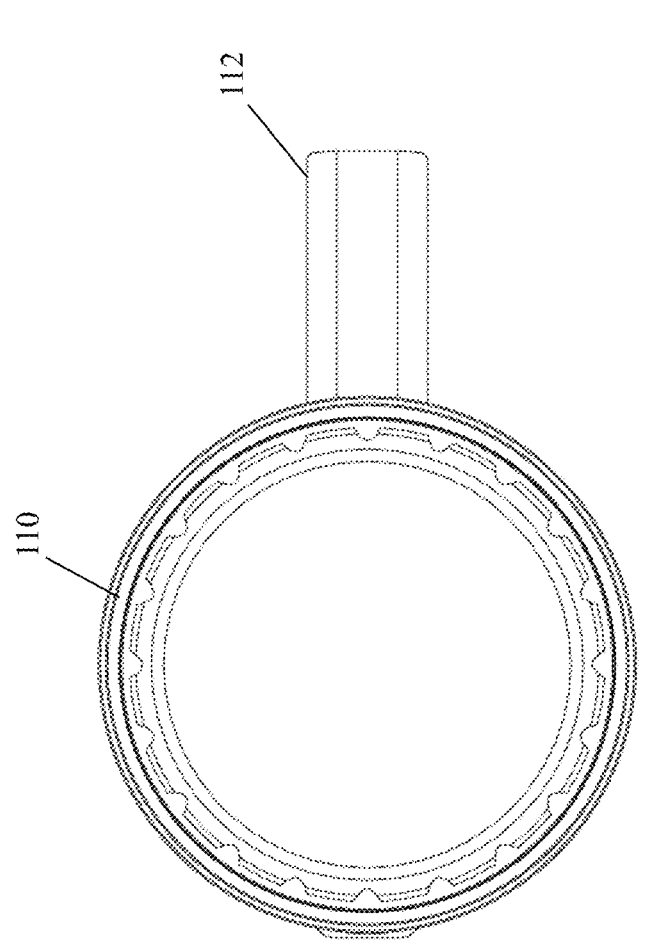
FIG. 4 is a bottom view of the baiting multi-tool apparatus illustrated in FIG. 1.
Figure 4:

FIG. 1 is a frontal perspective view of a baiting multi-tool apparatus 100 according to an embodiment of the present inventive concept, FIG. 2 illustrates a front view of the baiting multi-tool apparatus illustrated in FIG. 1, FIG. 3 is a top view of the baiting multi-tool apparatus illustrated in FIG. 1, and FIG. 4 is a bottom view of the baiting multi-tool apparatus illustrated in FIG. 1

Figure 5:
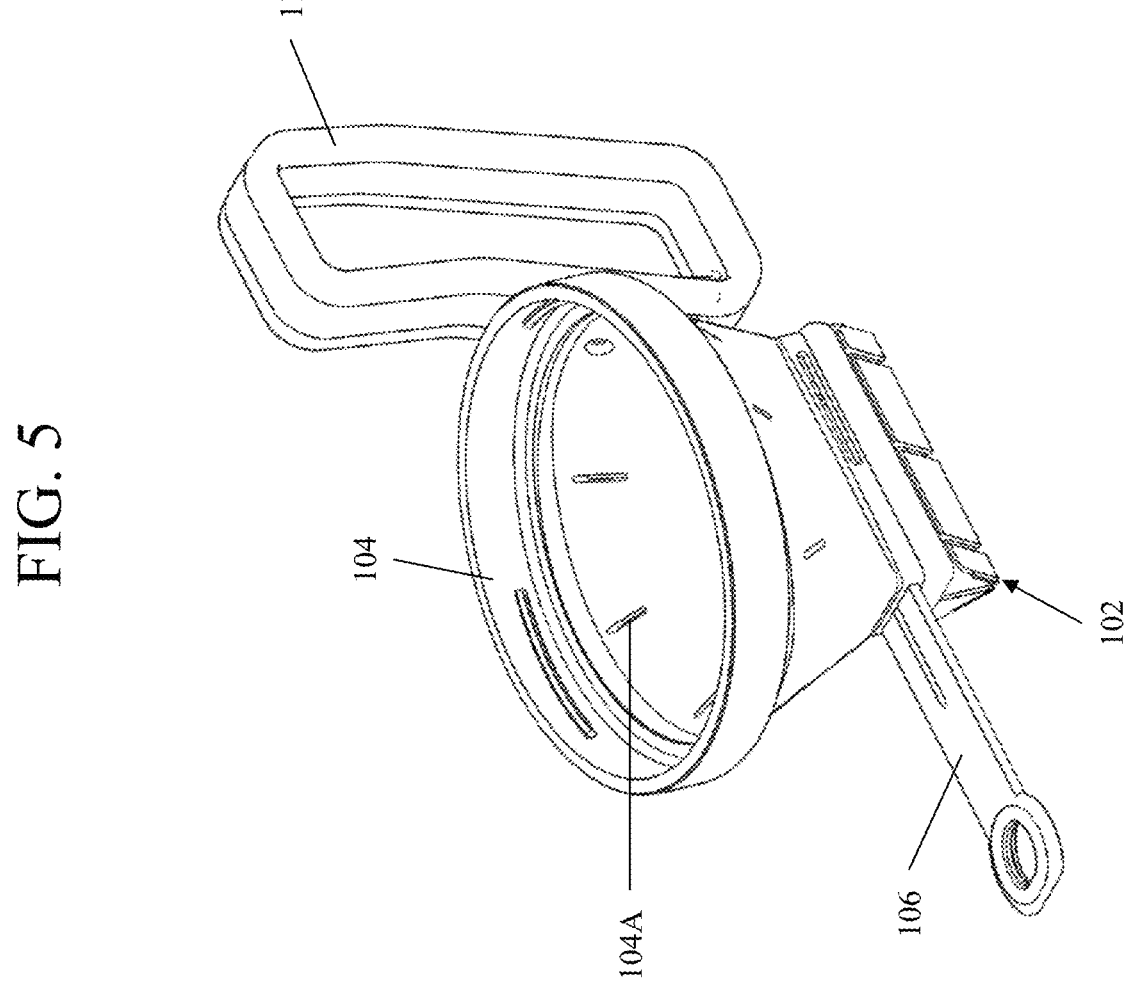
FIG. 5 is a side perspective view of the funnel member and bait holding compartment of the baiting multi-tool apparatus illustrated in FIG. 1, including a view of the sliding door separating these two components and a handle for convenience of a user.
Figure 5:
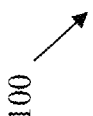
Figure 6:
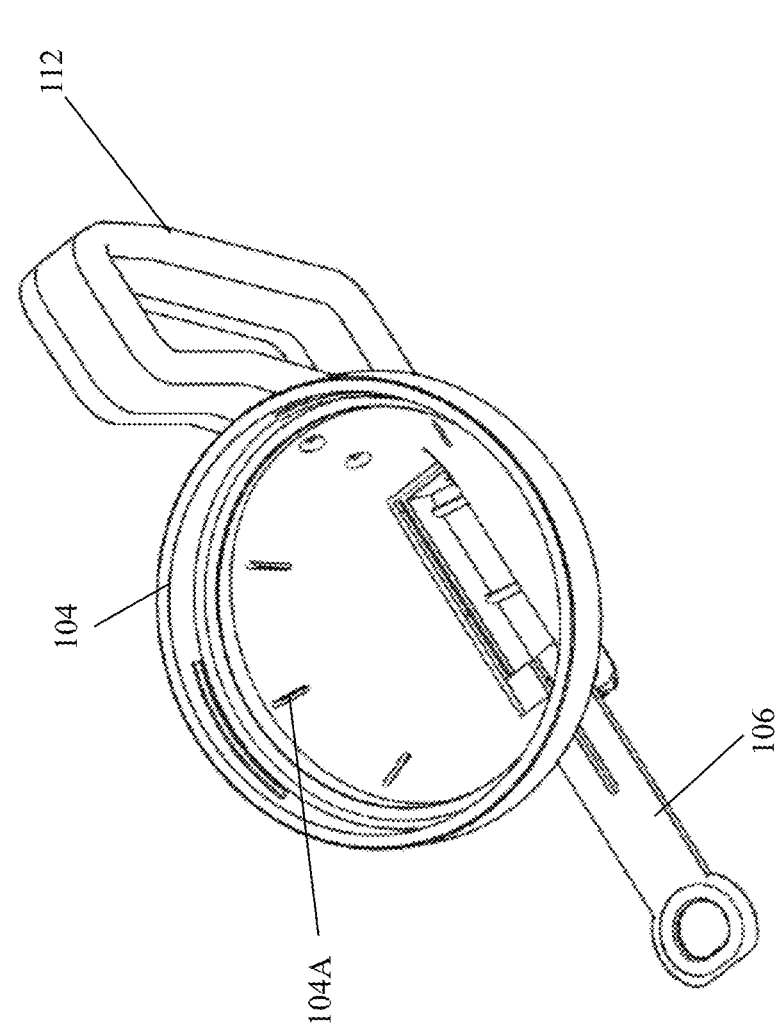
FIG. 6 is a top perspective view of the funnel member, sliding door, and handle of the baiting multi-tool apparatus illustrated in FIG. 1.
Figure 6:
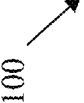
Figure 7:
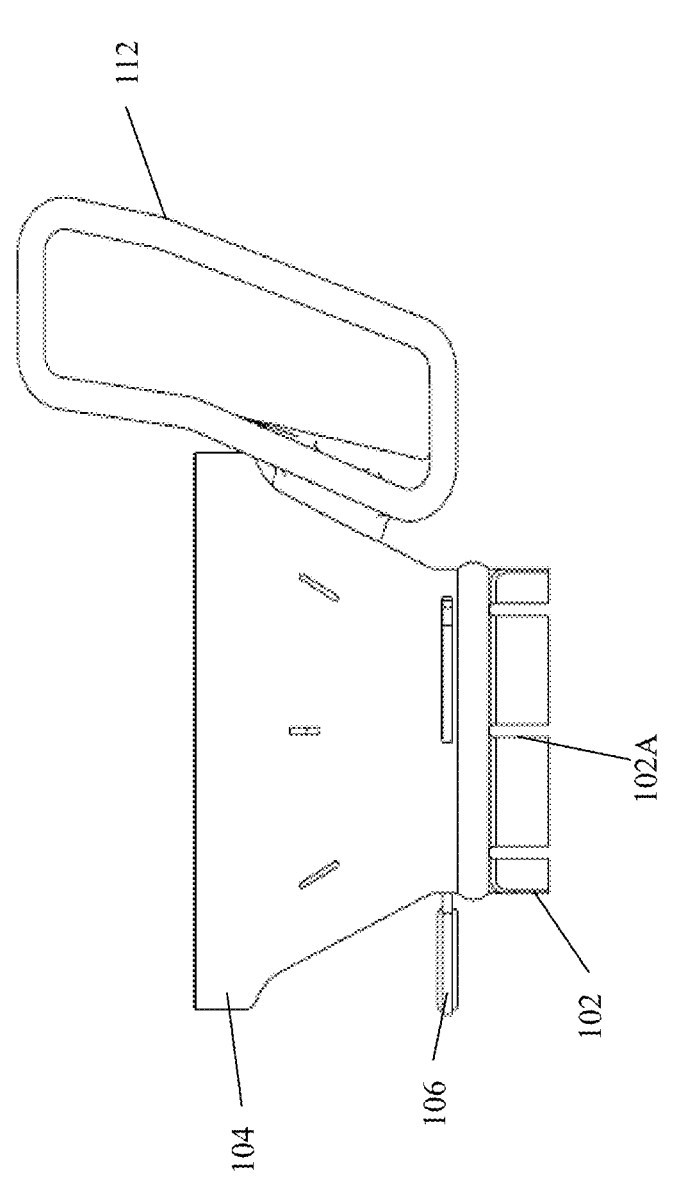
FIG. 7 is a side view of the funnel member, sliding door, bait holding compartment, and handle of the baiting multi-tool apparatus illustrated in FIG. 1.

FIG. 5 is a perspective view of the funnel member and bait holding compartment of the baiting multi-tool apparatus illustrated in FIG. 1, along with the sliding door separating these two components and a handle for holding the funnel member/bait holding compartment. FIG. 6 is a top perspective view of funnel member/bait holding compartment of the baiting multi-tool apparatus illustrated in FIG. 1 and FIG. 7 is side view of the funnel member/bait holding compartment and associated sliding door and handle.

FIG. 1 shows a preferred embodiment 100 that includes not only the bait holding compartment 102 and funnel member 104, but also shows a live bait storage container 108 and tackle storage container 110, all of which are selectively coupled together to form a convenient integrated multi-tool apparatus, using, for example, a simple threaded structure by which the components can be screwed together (e.g., see FIG. 5) to form the integrated coupled structure 100 shown in FIG. 1, so that the components could fastened/unfastened by twisting components using the threaded structure. One of ordinary skill in the art would recognize that other non-limiting fastening mechanisms are also possible. For example, clamps could be used to clamp the components together, or latches could be used to latch the components together.

The live bait storage container 108 provides a compartment to store live bait, which could be minnows or other small fish, crayfish, frogs, crickets, grasshoppers, worms, etc. For some bait types such as minnows or crayfish, the live bait storage container might be required to include water to keep the bait alive during storage. Accordingly, the live bait storage container 108 is preferably constructed of a water impermeable material such as a rigid plastic material and is fabricated as a hollow cylinder having a bottom to hold water and open at the top.

The tackle storage container 110 is likewise a cylinder having a bottom and open at the top and provides a convenient storage space for such fishing accessories as hooks, sinkers, spare line, lures, etc. The tackle storage container 110 is preferably fabricated using a rigid plastic material that is water tight to protect the tackle stored therein from water damage and to provide an airtight structure that can provide floatation in a scenario in which the multi-tool apparatus 100 inadvertently gets knocked into or falls into the water.

The funnel member 104, sliding door 106, and handle 112 are also all preferably fabricated with a water impermeable rigid plastic material, with the funnel member 104 having openings (e.g., slits) 104A that permit water to drain from the funnel member when the funnel member is used to dip into a bait storage container such as a bucket containing water and live bait. These holes 104A also serve to provide air to live bait that does not require water to stay alive, such as crickets, grasshoppers, worms, etc. In a preferred embodiment, the funnel member 104 and live bait storage container 108 are both constructed of a clear rigid plastic material, to permit the live bait to be visible both during storage and during times that a live bait specimen is being held in the funnel member 104 (e.g., see FIG. 8).

The bait holding compartment 102 is fabricated using a flexible material such as rubber or a soft plastic, so that sides of the bait holding compartment 102 will flex outward sufficiently to permit a hooked bait specimen to be extracted easily from the bait holding compartment 102 through the longitudinal slit 102B without tearing of tissue of the hooked bait specimen.

| Referring to FIGS. 1 through 7, the baiting multi-tool apparatus, designated generally as 100, is illustrated in various views. In the present embodiment, the baiting multi-tool apparatus 100 is designed and configured as to help fishermen hook bait easier, cleaner, and quicker. That is, the baiting multi-tool apparatus 100 is designed to help fishermen hook live bait easier, cleaner, and quicker. However, the present general inventive concept is not limited thereto.

The exemplary embodiment of the present invention provides a bait holding compartment 102 having a plurality of slots 102A on opposing side walls of the bait holding compartment 102. The bait holding compartment 102 securely holds a live bait specimen while a user can then properly hook the bait through one of the cutout slits 102A (e.g., see FIG. 8). In particular, the baiting multi-tool apparatus 100 provides a device that secures a single bait specimen in a position that securely holds the specimen to make it easier to hook with minimal risk of the user accidentally jabbing themselves with the tip of the hook. Three cutout slits 102A are demonstrated in the exemplary embodiment shown in the figures as found to be convenient given the size of the bait holding compartment 102 and sizes of different types of live bait with the option of piercing the specimen at various points along the length of the specimen's body. However, it should be clear that different numbers of cutout slits 102A could be incorporated, including, for example, only one cutout slit, two cutout slits, or more than the three cutout slits 102A shown in the figures, so the invention is not limited by the number of slits 102A exemplarily shown in the figures.

In the present embodiment, the baiting multi-tool apparatus 100 includes the funnel member 104 that can be used to capture a single live bait specimen from, for example, a bucket (not shown in the figures) or from the live bait storage container 108 storing multiple bait specimens.

When used to scoop out live bait from a bucket (not shown in the figures), the funnel member 104/bait holding compartment 102 is separated from the multi-tool apparatus 100 and dipped into the bucket storing multiple bait specimens, to capture one or more live bait specimens from the bucket in the funnel member 104, and some water drains out the slit openings 104A as the funnel member is withdrawn from the bucket.

When used to isolate a live bait specimen being stored in the live bait storage container 108 of the multi-tool apparatus 100, the funnel member 104/bait holding compartment 102 can be separated from the multi-tool apparatus 100 and the live bait storage container 108 storing multiple bait specimens is tilted until a single specimen slides out of the container 108 into the funnel member 104.

Figure 8:
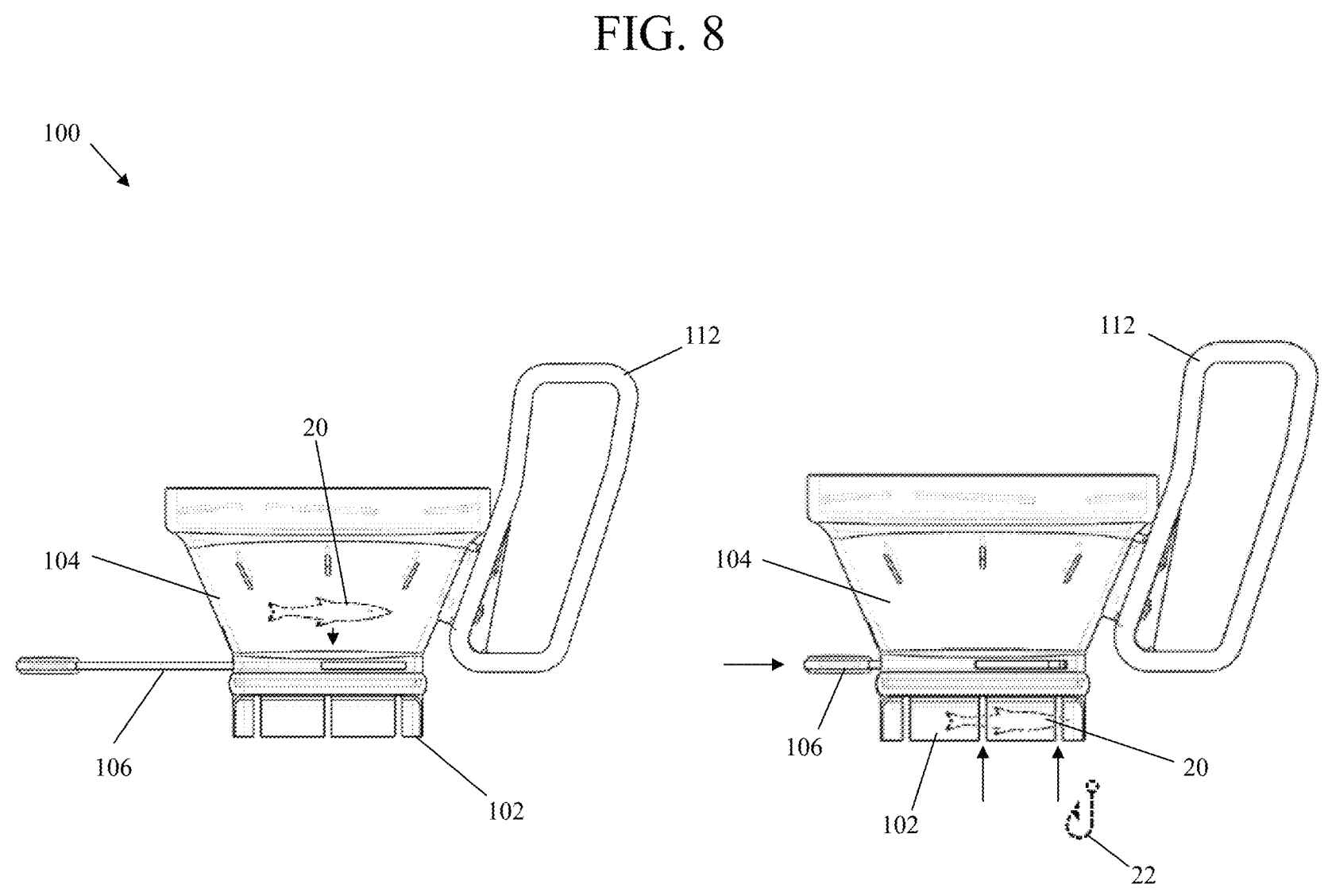

As exemplarily shown in FIG. 8, once captured by the funnel member 104, the sliding door 106 can be slid forward to drop the isolated bait specimen 20 into the bait holding compartment 102 for securely holding the specimen in position for hooking. A hook 202 can then hook the captured live specimen 20 through any of the side slits 102A of the bait holding compartment 102, and the hooked specimen can then be extracted from the holding compartment 102 by pulling the hook with the hooked specimen downward through the longitudinal slit 102B (see FIG. 3) along the bottom side of the bait holding compartment 102. Because the hooked bait will be extracted via the bottom of the bait holding compartment, the bait holding compartment 102 is fabricated from a flexible material such as rubber or other flexible plastic material so that the sides of the bait holding compartment 102 will open sufficiently to permit the hooked specimen to be extracted without further injury to the hooked specimen. However, the present general inventive concept is not limited thereto.

Thus, in the context of the present invention, the term "flexible" means that the material of the holding compartment is sufficiently rigid to keep a squirming bait specimen from escaping from the holding compartment 102 through either the slits 102A in the sidewalls of the holding compartment 102 or the longitudinal slit 102B on the floor of the holding compartment 102 while still being sufficiently flexible to permit a hooked specimen to be extracted from the holding compartment 102 by pulling the hook downward through the longitudinal slit 102B without causing additional damage to the hooked specimen.

The baiting multi-tool apparatus 100 is also designed with a handle 112 attached or affixed to the funnel member 104, which handle 112 provides a convenient structure for holding and using the funnel member 104 to capture a specimen and during the hooking procedure with the captured specimen held in the holding compartment 102.

In the non-limiting exemplary embodiment, the multi-tool apparatus 100 is demonstrated as a cylindrical structure comprising a tackle storage compartment 110, a live bait storage compartment 108 and a funnel member 104 having attached thereto a bait holding compartment assembly 102, a sliding door assembly 106, and handle 112. However, the present inventive concept is not limited thereto.

That is, in alternate embodiments, the baiting multi-tool apparatus 100 may further include a bait holding compartment 102 with an additional slidable door to isolate a single bait fish in the bait holding compartment 102 in which more than one bait fish ends up inside the bait holding compartment 102 from the funnel member 104. However, the present inventive concept is not limited thereto.

In the exemplary embodiment, the multi-tool apparatus 100 comprises three primary components: the funnel member 104/bait holding compartment 102, the live bait storage compartment 108, and the tackle storage compartment 110, which can be selectively coupled together to form an integrated multi-tool baiting apparatus such as demonstrated in FIG. 1.

However, in alternative embodiments, the tackle storage compartment 110 and/or the live bait storage compartment 108, could be deleted, leaving, for example, only the funnel member 104/bait holding compartment 102 as a standalone assembly that would serve the purpose of holding live bait specimens as obtained by dipping the funnel member 104 into a standalone bucket of live bait.

In yet further alternative embodiments, the funnel member 104/bait holding compartment 102 could be two separate structures in which the funnel member 104 with an associated sliding door 106 comprises a first component to dip into a bucket holding live bait specimens to capture one or more bait specimens from the bucket and hold the captured specimen(s) until the funnel member 104/sliding door 106 is coupled to a second component which corresponds to the bait holding compartment 102 to permit the isolated bait specimen to be hooked.

Thus, it should be clear that a key feature of the present invention is a structure corresponding to the bait holding compartment 102 that provides a structure and mechanism by which a single live bait specimen is securely held in a compartment having more or more openings in opposing lateral sidewalls through which a hook tip can be inserted to hook the isolated live specimen and the hooked specimen can be extracted through a longitudinal slot 102A at the bottom of the bait holding compartment 102 with minimal risk that the user will jab themselves in attempting to attach a live specimen to a fish hook. However, the present general inventive concept is not limited thereto. That is, in alternative embodiments, the baiting multi-tool apparatus 100 is also designed to align and hook artificial bait, bait pellets, cut bait, and the like.

Finally, it is noted that, although the present invention was developed for use in hooking live bait specimens, it should be clear that the invention is also useful in hooking bait specimens that are no longer alive.

Although a few exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. A live bait baiting apparatus, comprising:
   a funnel member configured to permit an isolation and capture of at least one bait specimen;
   a bait holding compartment configured to receive and hold a single one bait specimen of the at least one bait specimen in a position that permits the single one bait specimen to be attached to a fish hook; and
   a sliding door that permits the single one bait specimen to selectively be transferred from the funnel member into the bait capture compartment.

2. The live bait baiting apparatus of claim 1, wherein the bait capture compartment includes at least one slit opening on opposing lateral surfaces thereof that exposes the single bait specimen held in the bait holding compartment, so that a hook tip of the fish hook can pierce through the single bait specimen to be thereby attached to the fish hook.

3. The live bait baiting apparatus of claim 2, wherein a bottom surface of the bait holding compartment comprises a flexible material with a longitudinal slit opening interconnected with each of the at least one slit opening on opposing lateral surfaces of the bait holding compartment, so that the fish hook and the attached single bait specimen can be extracted from the bait holding compartment without further damage to the hooked bait specimen by pulling the hook and hooked specimen downward through the longitudinal slit opening.

4. The live bait baiting apparatus of claim 3, wherein the at least one opening on opposing lateral surfaces comprises a plurality of openings distributed along a length of the bait holding compartment, so that the single bait specimen can be pierced by the hook tip at any of a plurality of positions along a length of the single bait specimen held in the bait holding compartment.

5. The live bait baiting apparatus of claim 1, further comprising a live bait storage compartment configured to hold a plurality of live bait specimens that can be selectively chosen to be isolated by the funnel member, the live bait storage compartment and funnel member configured to be selectively attached/detached from each other.

6. The live bait baiting apparatus of claim 5, wherein the live bait storage compartment is comprised of a waterproof material so that water-dwelling live bait specimens such as minnows can be stored in water in the live bait storage compartment as live bait specimens.

7. The live bait baiting apparatus of claim 5, wherein the bait holding compartment has dimensions predetermined to permit a plurality of different types of bait specimens to be received and held for hooking.

8. The live bait baiting apparatus of claim 7, wherein the plurality of different types of bait specimens includes at least small fish such as minnows, crickets, grasshoppers, worms, and crayfish.

9. The live bait baiting apparatus of claim 1, further comprising a tackle storage compartment configured to hold fishing tackle, the tackle storage compartment configured to be selectively attached/detached from the live bait baiting apparatus.

10. A method for baiting a fish hook, the method comprising:
    isolating and capturing at least one bait specimen using a funnel member configured to permit an isolation and capture of one or more bait specimens;
    selectively operating a sliding door separating the funnel member from a bait holding compartment, such that a single bait specimen isolated and captured in the funnel member is transferred into and held in the bait holding compartment, the bait holding compartment having at least one slit opening on opposing lateral surfaces of the bait holding compartment that permits the single bait specimen to be pierced by a fish hook; and
    piercing the single bait specimen with a hook tip of the fish hook through one of the at least one slit openings to thereby attach the single bait specimen to the fish hook.

11. The method of claim 10, wherein the bait holding compartment comprises a bottom surface comprised of a flexible material having a longitudinal slit opening interconnected with each of the at least one slit opening on opposing lateral surfaces of the bait holding compartment, the longitudinal slit opening having dimensions predetermined to permit the single bait specimen attached to the fish hook to be extracted from the bait holding compartment, the method further comprising extracting the fish hook and the single bait specimen attached to the fish hook from the bait holding compartment through the at least one openings on opposing lateral surfaces of the bait holding compartment and through the longitudinal slit opening on the bottom surface of the bait holding compartment.

12. The method of claim 11, wherein the funnel member and bait holding compartment is an integrated structure that is selectively attachable to a bait storage compartment configured to hold at least one live bait specimen, the method further comprising using the funnel member to isolate and capture at least one live bait specimen held in the bait holding compartment such that the at least one live bait specimen is isolated and captured in the funnel member and can be transferred into the bait holding compartment by operating the sliding door separating the funnel member from the bait holding compartment.

13. The method of claim 12, wherein the bait storage compartment comprises a waterproof material so that water-dwelling bait specimens such as minnows or crayfish can be stored in water in the bait storage compartment as live bait specimens.

* * * * *